United States Patent
Kaplan et al.

(10) Patent No.: US 7,496,379 B2
(45) Date of Patent: Feb. 24, 2009

(54) SYSTEM AND METHOD FOR PROVIDING SMS CONTACT INFORMATION TO A WIRELESS MOBILE DEVICE

(75) Inventors: Diego Kaplan, San Diego, CA (US); Refael Bar, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 635 days.

(21) Appl. No.: 11/112,494

(22) Filed: Apr. 22, 2005

(65) Prior Publication Data

US 2006/0240868 A1 Oct. 26, 2006

(51) Int. Cl.
*H04B 1/38* (2006.01)

(52) U.S. Cl. ............. 455/557; 455/558; 455/418; 455/419; 455/50.1; 235/382; 235/495

(58) Field of Classification Search ............ 455/557, 455/558, 418, 419, 420, 50.1; 235/382, 495, 235/380
See application file for complete search history.

(56) References Cited

U.S. PATENT DOCUMENTS

| | | | | |
|---|---|---|---|---|
| 5,812,531 A * | 9/1998 | Cheung et al. | ............ | 370/255 |
| 6,625,460 B1 * | 9/2003 | Patil | ............ | 455/466 |
| 6,641,035 B1 * | 11/2003 | Predescu et al. | ............ | 235/380 |
| 6,641,050 B2 * | 11/2003 | Kelley et al. | ............ | 235/492 |
| 6,698,653 B1 * | 3/2004 | Diamond et al. | ............ | 235/375 |
| 6,705,518 B2 * | 3/2004 | Park et al. | ............ | 235/380 |
| 6,708,045 B1 * | 3/2004 | Lieu et al. | ............ | 455/557 |
| 6,776,339 B2 * | 8/2004 | Piikivi | ............ | 235/451 |
| 6,824,049 B2 * | 11/2004 | Lee et al. | ............ | 235/380 |
| 6,863,220 B2 * | 3/2005 | Selker | ............ | 235/492 |
| 6,928,301 B2 * | 8/2005 | Souissi et al. | ............ | 455/557 |
| 6,933,905 B2 * | 8/2005 | Ippolito | ............ | 343/797 |
| 7,013,155 B1 * | 3/2006 | Ruf et al. | ............ | 455/466 |
| 7,014,120 B2 * | 3/2006 | Al Amri | ............ | 235/487 |
| 7,028,897 B2 * | 4/2006 | Fernandes et al. | ............ | 235/449 |
| 7,079,830 B2 * | 7/2006 | Critz et al. | ............ | 455/403 |
| 7,079,861 B2 * | 7/2006 | Critz et al. | ............ | 455/552.1 |
| 7,120,455 B1 * | 10/2006 | Chen et al. | ............ | 455/466 |
| 7,174,168 B2 * | 2/2007 | Klein et al. | ............ | 455/445 |
| 7,240,836 B2 * | 7/2007 | Vrotsos et al. | ............ | 235/439 |
| 2002/0004369 A1 * | 1/2002 | Kelly et al. | ............ | 455/12.1 |
| 2002/0087867 A1 * | 7/2002 | Oberle et al. | ............ | 713/183 |
| 2003/0194987 A1 * | 10/2003 | Pattabiraman et al. | ............ | 455/403 |
| 2004/0192372 A1 * | 9/2004 | Richards et al. | ............ | 455/550.1 |
| 2005/0143054 A1 * | 6/2005 | Fogel | ............ | 455/415 |
| 2006/0014540 A1 * | 1/2006 | Klein et al. | ............ | 455/445 |
| 2006/0293083 A1 * | 12/2006 | Bowen | ............ | 455/558 |

* cited by examiner

*Primary Examiner*—Minh D Dao

(57) ABSTRACT

A system and process for updating files on a wireless mobile device is provided. The wireless mobile device has an RF (radio frequency) card which cooperates with a wireless network to provide wireless communication. In one example, the wireless network maintains a message contact list on a network server. The message contact list contains address information useful for sending textual, video, audio, or image messages through the wireless network. When the wireless mobile device is activated on the network, the message contact list is transmitted to the wireless mobile device. The wireless mobile device is then able to use the message contact list to generate and transmit messages.

19 Claims, 6 Drawing Sheets

SYSTEM AND METHOD FOR PROVIDING SMS CONTACT INFORMATION TO A WIRELESS MOBILE DEVICE

CROSS REFERENCE TO RELATED APPLICATIONS

Not applicable.

STATEMENT REGARDING FEDERALLY SPONSORED RESEARCH AND DEVELOPMENT

Not applicable.

REFERENCE TO A COMPUTER LISTING, A TABLE, OR A COMPUTER PROGRAM LISTING COMPACT DISK APPENDIX

Not applicable.

BACKGROUND

1. Field

The present invention relates generally to wireless communication systems, and more specifically to providing updated messaging information to a wireless mobile device.

2. Description of Related Art.

Wireless communication devices are widely used, and have become an essential aspect of modern life. Wireless communication devices such as pagers, mobile phones, text pagers, PDA's (personal data assistants) are used for work, for personal activities, and as a way to keep in contact with family and friends. Often, these devices are used to enable voice communications. Increasingly, however, these devices are used to send brief messages without initiating a voice communication. In this way, information may be shared between users with less interruption and less distraction to others. Further, much communication may be completed in one-way transmissions, so the sending of a message can be very efficient. These messages have typically been limited to text messages, but are becoming more complex, with longer text capabilities, and the ability to support audio, image, graphical, and video messages.

One popular and widely used messaging system is the "Short Message Service", or SMS. SMS is a standard incorporated in many networks, devices, and applications to support sending and receiving messages. The SMS system provides a means by which short messages can be sent from one wireless mobile device to another device. Typically, such messages are textual and limited in length, for example to 160 alphanumeric characters. Such short messages are desirably used for simple communications, such as receiving stock market quotes, abbreviated e-mail, bank account balances, short commercial transactions, traffic conditions, and other such short messages. It will be appreciated that SMS may be provided on various communication platforms. For example, SMS may apply to GSM network systems, CDMA network systems, WCDMA network systems, and other industry standard systems. It will also be appreciated that certain extensions are in use or contemplated for the SMS systems. For example, SMS may extend to allow audio, image, or video data to also be transmitted and received. Also, the length and complexity of messages may be adjusted according to technical capability of mobile devices and network infrastructure.

In order for a computing device to send and receive SMS messages, it must be provided with the capability to operate on a wireless network. Often, a radio frequency (RF) card is inserted into the computing device, and associated operating software used to establish communication between the computing device and the network. For example, RF cards may be constructed to be inserted into PDAs, laptop computers, bar code scanners, or other computing devices. In order to initiate an SMS message, the originating computing device must know the address of the destination device. This address is typically the access number for the destination's RF card, which may be phone number or other network identifier. Since a user typically communicates with a number of other users, the SMS addresses are locally stored in a contact list file. In this way, the computing device is able to readily address and originate messages to known destinations.

However, may computer users have access to multiple computing devices. It is not uncommon for a user to have multiple laptop computers and PDAs, or to use different computing devices at different times. Each of these devices maintains its own SMS contact list, each of which contains only the destination addresses used from that particular device. Accordingly, when using a new computing device or when changing devices, it is often necessary to manually locate destination addresses and to populate the new device's contact list.

SUMMARY

Briefly, the present invention provides a system and process for updating files on a wireless mobile device. The wireless mobile device has an RF card which cooperates with a wireless network to provide wireless communication. In one example, the wireless network maintains a message contact list on a network server. The message contact list contains address information useful for sending textual, video, audio, or image messages through the wireless network. When the wireless mobile device is activated on the network, the message contact list is transmitted to the wireless mobile device. The wireless mobile device is then able to use the message contact list to generate and transmit messages.

In a more specific example, a computing device is provided with an RF card. At power-up, the RF card connects to the wireless network, and then to a network server. The network server maintains an SMS contact list file, which has address information useful to the computing device and to the network for sending text messages through the network. If the SMS contact list on the server is more current than a preexisting SMS contact list on the computing device, then the SMS contact list from the server is transmitted to the computing device. Because the RF card has unique identification information, the unique identifiers may be used to encrypt and unencrypt stored files. In this way, encrypted files are only useable if the RF card is in the computing device.

These and other features of the present invention will become apparent from a reading of the following description, and may be realized by means of the instrumentalities and combinations particularly pointed out in the appended claims.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
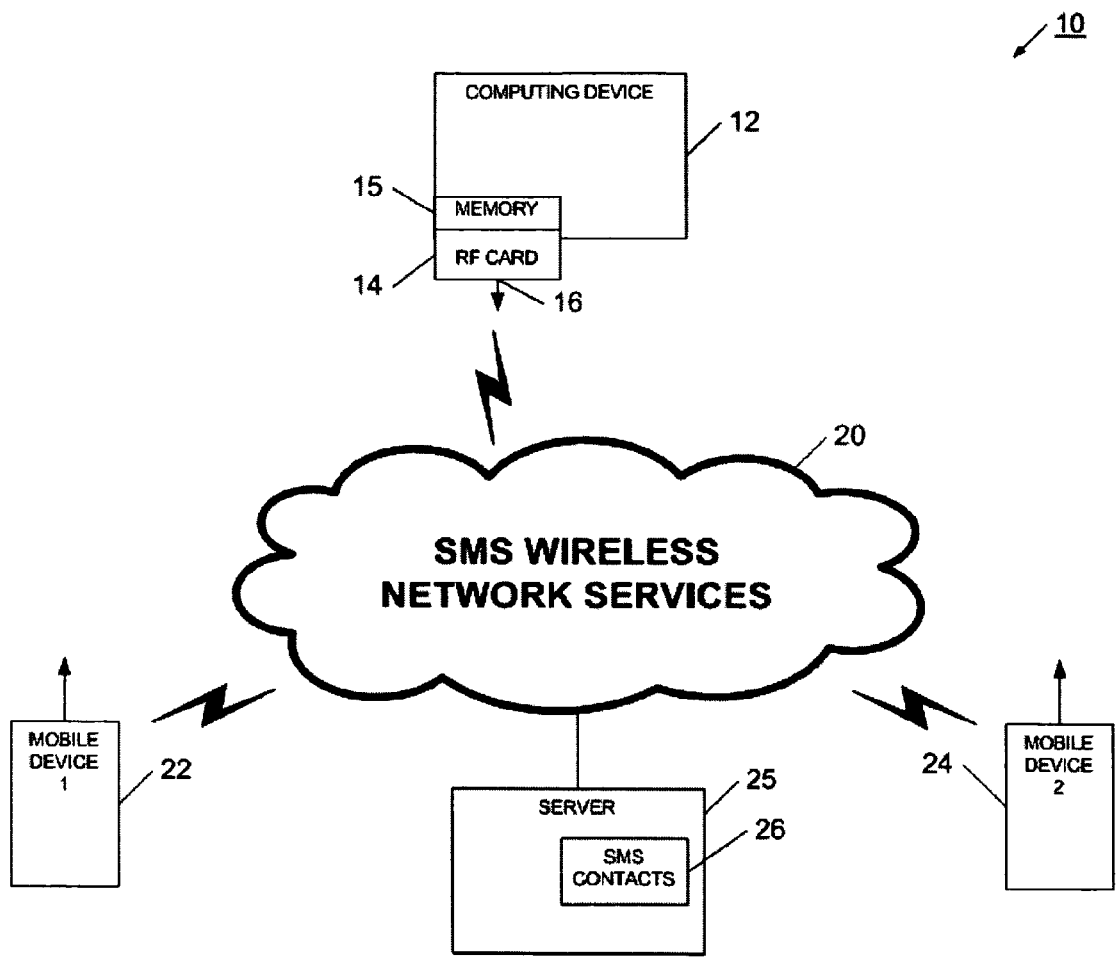
FIG. 1 is a block diagram a messaging wireless communication system in accordance with the present invention.

Referring now to FIG. 1, a system for providing SMS contact information is illustrated. Although system 10 is described with reference to the SMS message standard, it will be understood that other message standards may be used. For example, an EMS system (Enhanced Message Service) or MMS (Multimedia Messaging Service) may also be used. It will also be understood that messaging standards evolve and adapt as technology and user requirements change. System 10 includes a remote computing device 12 which is configured to communicate wirelessly with an SMS wireless network service 20. To establish communication, a computing device 12 has a radio frequency (RF) card 14 which cooperates with the network services 20 to provide a wireless communication link. The radio frequency card 14 has an antenna 16 for facilitating wireless communication, as well as memory 15 and other circuitry to electronically couple with computing device 12. The network services 20 include antenna systems, base stations, and other infrastructure equipment for enabling and operating a wireless network service. The SMS wireless network service 20 has a server 25 connected to the network. The server 25 may be part of the infrastructure equipment, or may be coupled to the services via a network connection. Other devices, such as mobile devices 22 and 24 communicate through the wireless network services 20. It will be appreciated that the mobile devices may be for example, wireless mobile handsets, wireless personal data assistants, portable computers, or other wireless devices.

Network service 20 operate a short message system (SMS) system. The SMS system provides a means by which short messages can be sent from one wireless mobile device to another device. Typically, such messages are textual and limited in length, for example to 160 alphanumeric characters. Such short messages are desirably used for simple communications, such as receiving stock market quotes, abbreviated e-mail, bank account balances, short commercial transactions, traffic conditions, and other such short messages. It will be appreciated that SMS may be provided on various communication platforms. For example, SMS may apply to GSM network systems, CDMA network systems, WCDMA network systems, and other industry standard systems. It will also be appreciated that certain extensions are in use or contemplated for the SMS systems. For example, SMS may extend to allow audio, image, or video data to also be transmitted and received. Also, the length and complexity of messages may be adjusted according to technical capability of mobile devices and network infrastructure. The construction and operation of computing devices, RF cards, network services, and mobile devices is well known, so will not be discussed in detail herein.

When initiating a SMS message, the computing device 12 addresses the message to a particular device, such as mobile device 22. In order to properly address the SMS message, the computing device therefore must have contact information for the SMS address of the device. To operate efficiently, the list of SMS contact addresses should be available to the computing device 12 from memory 15. Memory 15 may be integral to computing device 12 and therefore is separate from RF card 14. In this arrangement, the memory 15 is associated with the computing device 12, and not the RF card 14. Typically, the RF card 14 is removable from computing device 12, and may be moved from one computing device to another. However, it will be appreciated that the RF card may be integrally constructed with a computing device.

In operation, the RF card 14 cooperates with the network services 20 and a server 25 to populate the memory 15 with contact list information. In one example, the memory 15 in computing device 12 does not contain any contact list information when the computing device 12 is powered on. When the computing device desires to send an SMS message, or upon powering the RF card 14, the RF card 14 accesses the SMS wireless network services 20. The network services 20 facilitate a communication between the RF card 14 and the server 25. Server 25 holds an SMS contact file 26, which contains a list of contact information that has been associated with RF card 14. Since each RF card 14 has unique identification information, the server 25 is able to select the SMS contact file associated with RF card 14. Contact information from file 26 is transferred across the network services 20 to RF card 14, and is stored in memory 15. It will be understood that the information stored in memory 15 may be stored in an encrypted or unencrypted manner, depending upon the level of security desired. Since computing device 12 now has address information in its memory 15, the computing device 12 is able to properly address SMS messages to those listed in its contact list file.

Advantageously, the SMS contact file 26 residing on server 25 is associated with a particular and unique RF card 14. In this way, the user's contact list information is available on any computing device in which the user places the RF card 14. For example, businesses often have a pool of available laptop computers. If a user has an RF card, such as RF card 14, irrespective of which laptop computer they receive, the contact list associated with RF card 14 is available for immediate use. More particularly, when the user inserts their RF card into any computing device, the computing device will be automatically and transparently updated to have that user's SMS contact information. This relieves the user from maintaining and updating such files manually. The contact list information may be stored in the computing device in a random access memory, so that when the computing device 12 is powered off the contact list information is no longer available. In another example, the contact list information may be stored in a nonvolatile memory, such as a flash or magnetic memory, so that the contact list information may be available at a later time. Further, the computing device 12 could be configured to disable, erase, or restrict access to memory 15 when the RF card 14 is not present in the computing device 12. In this regard, the authentication keys present in the RF card may be used in encrypting or otherwise securing memory 15.

Figure 2:
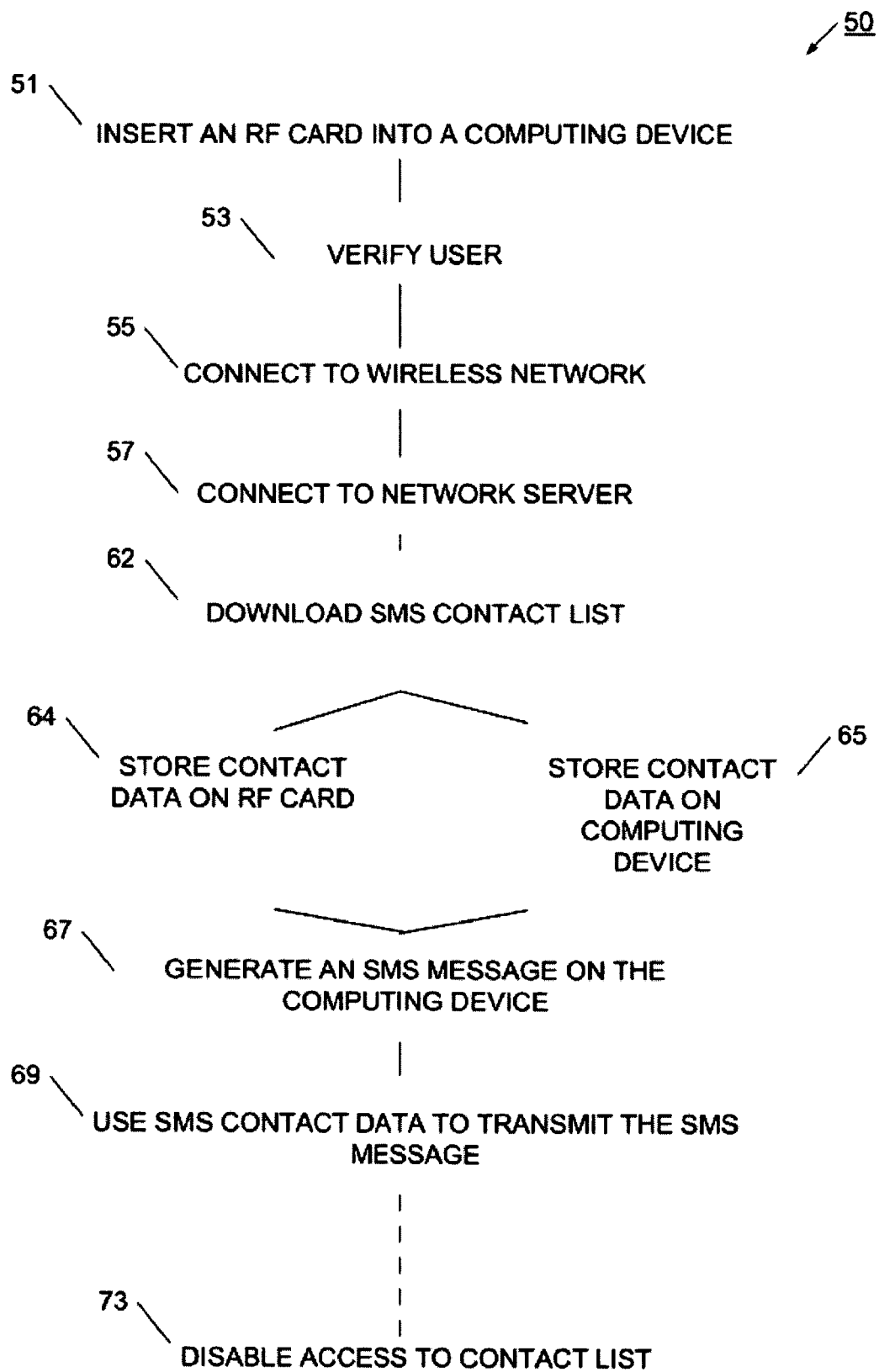
FIG. 2 is a flowchart of a method for providing an SMS contact list in accordance with the present invention.

Referring now to FIG. 2, a process for providing SMS contact information is illustrated. Process 50 begins when a user inserts an RF card into a computing device as shown in block 51. The computing device may then operate a verification routine as shown in block 53. Such verification process may include asking for passwords, usernames, or other challenge security methods. Provided the user is properly verified, then the RF card connects to the available wireless network as shown in block 55. Once connected to the network, the RF card is placed in communication with a network server 57. This network server has contact list information associated with the particular RF card. Since each RF card is uniquely identified, for example, by phone number, authentication key, or other identification data, the server is able to uniquely associate a contact list with a particular RF card. In another example, a set of RF cards may be associated with a particular contact list file. In this way, each person having one of the set of RF cards would have the same contact file list, and all users of cards in the set could remain updated accordingly. This may be desirable, for example, in a corporate environment where a common set of contact list addresses may be used. It will also be appreciated that the network server may have multiple contact lists associated with a particular RF card. In this way, the network server may associate a different information file with the RF card depending upon other criteria. For example, a different file could be associated with the RF card depending on the day of the week or the time. In this way, a user may obtain, for example, a personal contact list on weekends and in the evenings, while receiving a business contact list during business hours.

Once the network server has identified the proper contact list to associate with the particular RF card, the contact list information is transmitted and downloaded to the RF card and computing device as shown in block 62. The downloaded information will typically be stored in the memory of the computing device as shown in block 65. Alternatively, the contact information may be stored on the RF card itself, as shown in block 64. Either way, the computing device now has local access to a current contact list, and so therefore is able to properly address and generate an SMS message on the computing device as shown in block 67. The computing device cooperates with the network services to then transmit the SMS message to the proper remote device as shown in block 69. Typically, the contact list information will be available and accessible during the entire session when the user is operating the computing device. However, it will be appreciated that a more restrictive system could be arranged where contact list information is disabled after each message, or after a set of messages. In this way, the user may be required to provide security and authentication information prior to receiving new or updated contact information.

Also, when the computing device session is complete, and the computing device is powered off or otherwise disabled, the contact list is also typically disabled, as shown in block 73. For example, the computing device may have contact list information in dynamic memory, so the contact information is lost on power down. In another example, the computing device may encrypt the contact list information so that it is unavailable unless in contact with network services or the RF card is plugged in. It will also be appreciated, however, that the contact list information may remain unencrypted and available in the computing device, even after the message session is complete.

Figure 3:
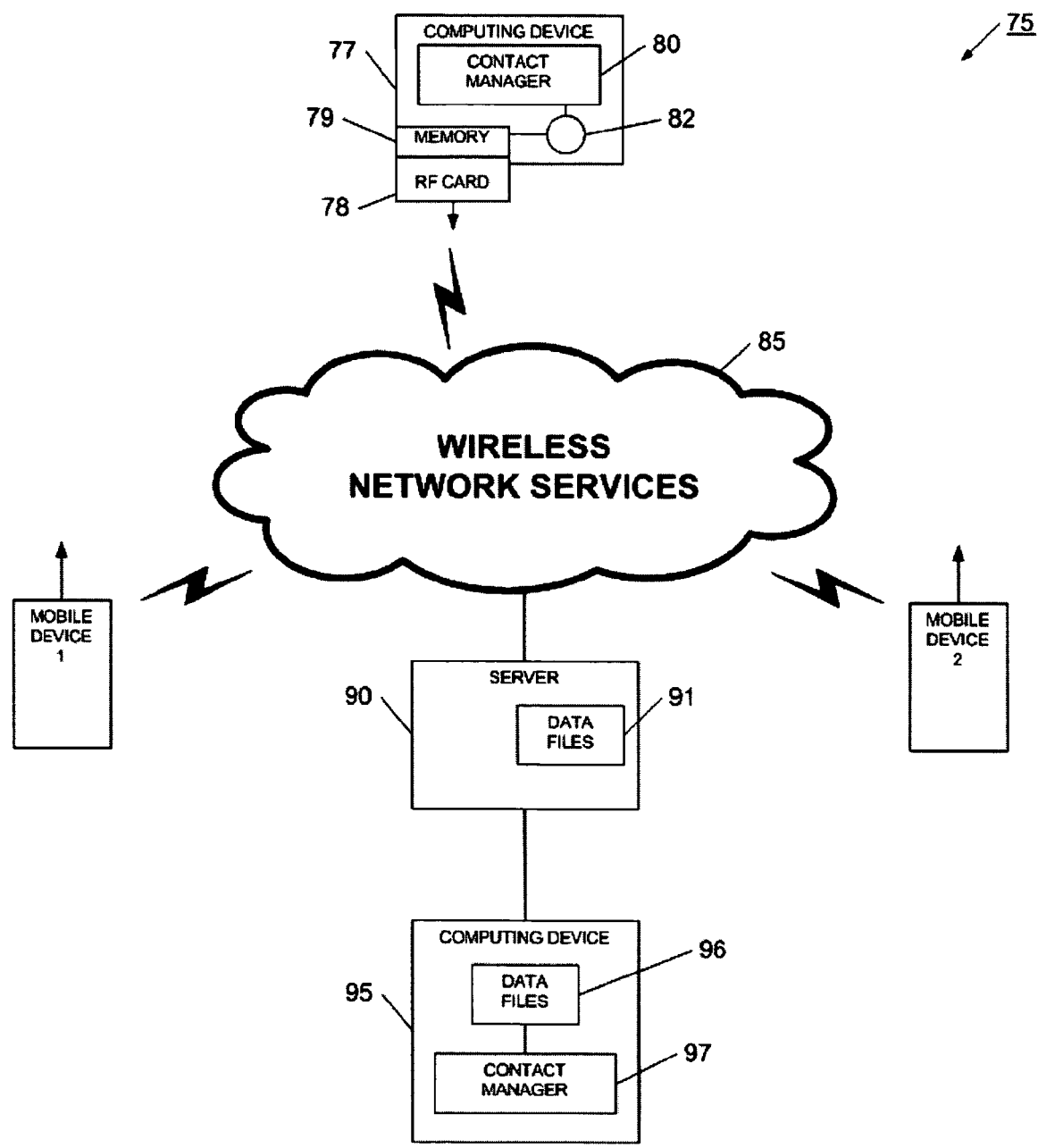
FIG. 3 is a block diagram a wireless communication system in accordance with the present invention.

Referring now to FIG. 3, a system for providing contact information is illustrated. System 75 includes a computing device 77 which has an RF card 78. The computing device also has an associated memory 79 for storing contact information. The contact information may be used by a contact manager application 80. It will be appreciated that several popular contact manager applications exist and are well known. The contact manager 80 may have an extension 82 or other driver for exchanging contact information with memory 79. This extension 82 may, for example, add additional fields into the contact manager 80 for holding specific information necessary for the RF card operation. In this way, address information, such as SMS, EMS, or MMS address information, may be collected and managed along with other contact manager information. The extension 82 may also facilitate encryption or unencryption of contact information in memory 79. In one example, the extension 82 uses authentication information in the RF card 78 for encrypting and decrypting contact information.

Typically, the RF card 78 has unique identifier information, such as network number, telephone number, or authentication key, which may be referred to as an A key. In a particular example, CDMA-based communication systems have an "A-key" permanently associated with each registered RF card. This CDMA A-key is unique to each RF card, and is never transmitted across the network. Instead, the RF card is pre-registered with the network operator prior to providing the RF card to a user. In this way, the network has knowledge of the A-key, although it is never transmitted through the network. Accordingly, the A-key is able to provide a relatively robust encryption process.

When the RF card 78 is placed in the computing device 77, the RF card cooperates with the network services 85 to establish communication with a server 90. The server 90 has data files 91 which are associated with RF card 78. For example, the data files 91 may include contact list information useful to the RF card and to the contact manager 80. Upon establishing communication, the computing device may determine if the memory 79 contains the latest contact information data. For example, a simple comparison with a last update time may indicate whether the data files 91 or the memory 79 contain the latest contact information. If the computing device has the most current contact list information, then the computing device may proceed to addressing and sending messages. If however, the computing device does not have the latest information, then the server transmits contact information through the network services 85 to the RF card 78. The contact information is used to update memory 79 to contain the latest contact information. In this way, computing device 77 is assured to be operating with the latest contact information. In a similar manner, if the contact information in the computing device is more current than the dated 91, then the contact information from computing device 77 may be communicated to server 90 where the data files 91 are updated according to the information from the computing device. In this way, the computing device and server remain synchronized as to the most current contact information. It will also be understood that the server 90 may hold several files of contact information, and selectively update these files according to the specific computing device with which it is communicating. For example, a computing device being used by salesperson may synchronize with a sales force contact database, as well as a customer contact database. However, the sales force user may not require address information for the accounting department, so that file would not be updated on computer 80.

A user often has more than one computer at their disposal. For example, many users have a remote mobile device such as a laptop, and a desktop computer. The desktop computer 95 may also be operating the same or similar contact manager 97 as operating on their remote laptop. In this way, the contact manager 97 maintains local contact data files 96. Periodically, the data files 96 may be synchronized with the data files 91 on server 90. In his way, contact information from a user's desktop system 95 may be used to maintain current server files, which then may be used to populate and update wireless computing devices. This may be particularly useful when a user moves between different portable devices. For example, if a user operates one laptop during business hours, and then uses a different laptop at home, then maintaining a current contact file is as simple as moving the RF card to the currently operated laptop. In this way, irrespective of what mobile computing device is used, the user has access to their most current contact list information.

Figure 4:
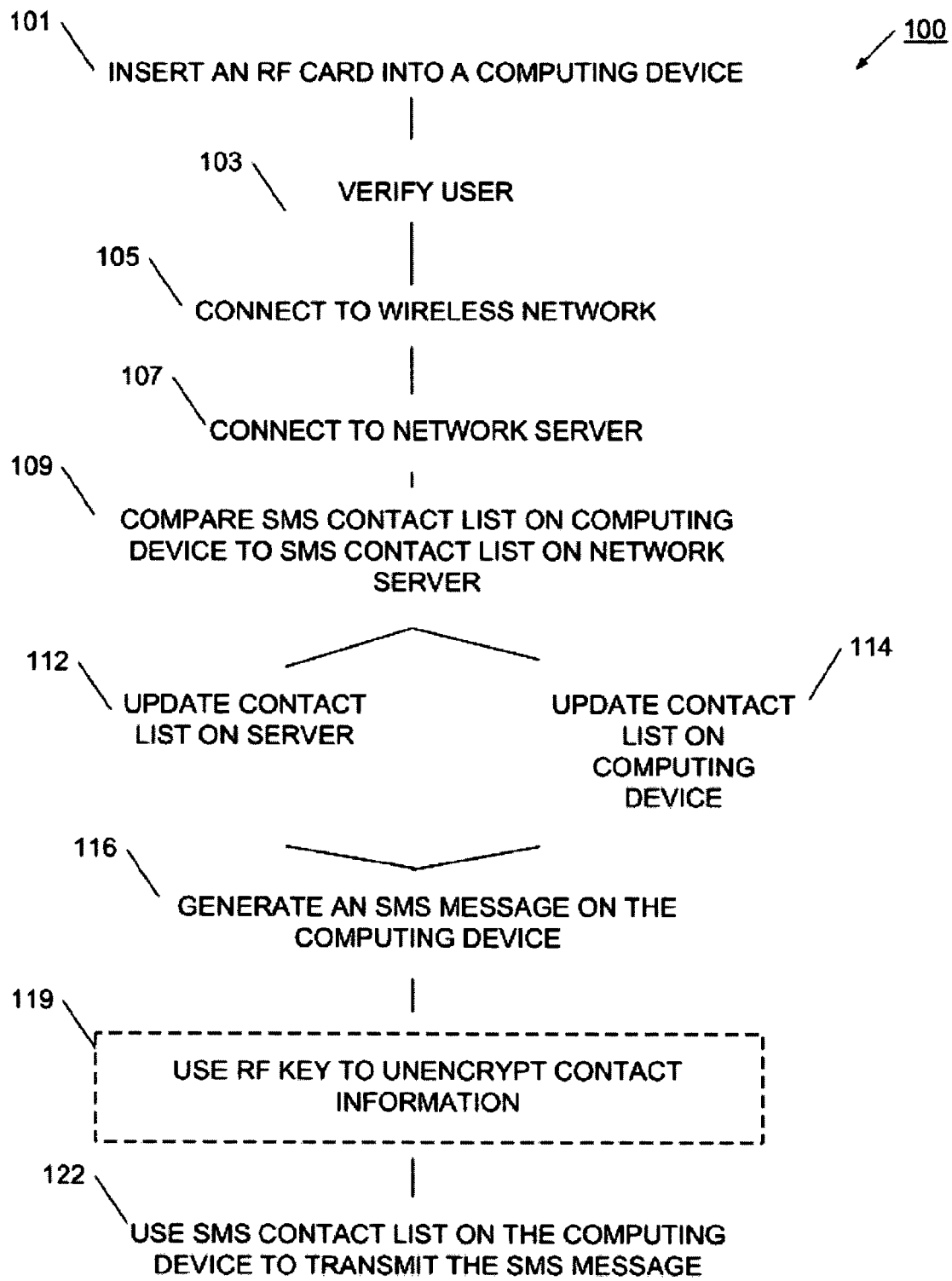
FIG. 4 is a flowchart of a method for providing a contact list in accordance with the present invention.

Referring now to FIG. 4, a process for providing contact information to wireless devices is illustrated. Process 100 starts with a user inserting RF card into a computing device as shown in block 101. The computing device uses username, password, or other challenge systems for verifying the user as shown in block 103. The computer, upon proper verification, connects to the wireless network as shown in block 105, and then establishes communication with the network server as shown in block 107. The contact list on the computing device is compared to the contact list on the network server as shown in block 109. If the server has a more recent list, then the list on the computing device is updated as shown in block 114. However, if the list on the computing device is more current, then the contact list on the server is updated as shown in block 112. Once the contact list has been synchronized with the network, then the computing device is able to properly address and generate messages, such as SMS messages as shown in block 116. As shown in optional block 119, the RF card may be used to provide additional security. For example, identification or authentication keys with in the RF card itself may be used to encrypt or unencrypt contact information data. Finally, as shown in block 122, SMS communication can be established with another device.

Figure 5:
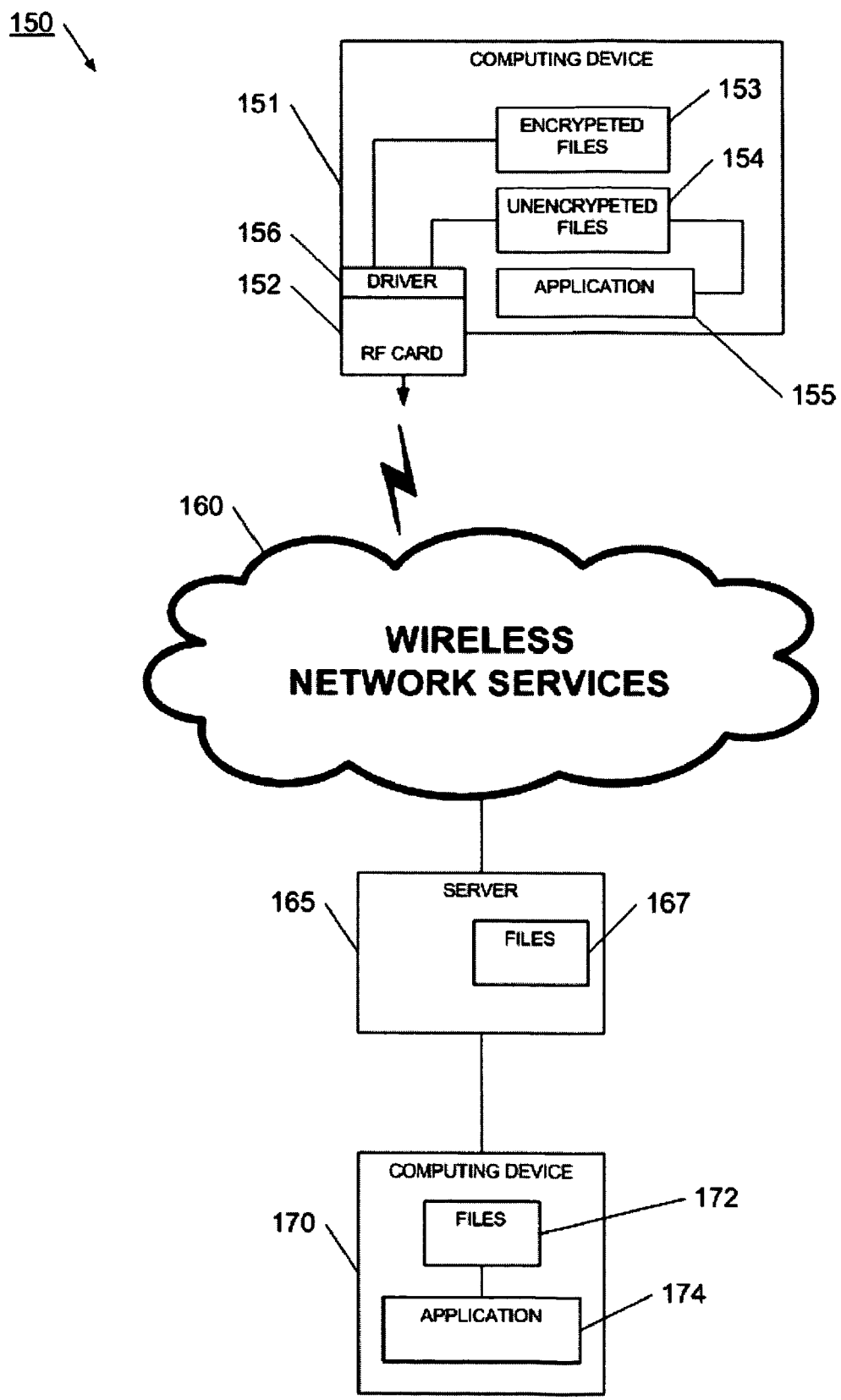
FIG. 5 is a block diagram a wireless communication system in accordance with the present invention.

Referring now to FIG. 5, another system for providing updated file information is illustrated. System 150 has a computing device 151 which has an RF card 152. The computing device 151 operates an application 155. The application has associated data requirements, and therefore requires data files. These data files may be provided as an unencrypted data file 154 while the application is operating. In this way, application 155 is able to extract information from unencrypted file 154, and place new information into file 154. However, when application 155 is terminated, or for particularly secure information, it may be desirable to encrypt a part or some of the unencrypted files 154. In this way, that information may be stored in encrypted file 153. The encrypted file 153 is generated by driver 156. Driver 156 receives the unencrypted files or data 154 and operates an encrypting algorithm on the data so that the encrypted files are stored in encrypted files 153. In particular, the driver 156 uses authentication keys or other identification information from RF card 152 in performing the encryption and decryption operations. In this way, if the RF card is present, the encryption and unencryption processes proceed normally. However, if the RF card is not present in the computing device, then the unencryption process may not occur. When the RF card 152 is not in the computing device 151, the encrypted files 153 are unavailable for the application 155, and even if extracted from the computing device, are unusable in another device. In this way, the RF card not only is used to establish wireless communication, but also is used to secure and encrypt data on computing device 151.

The computing device 151 establishes communication with the network services 160 to access server 165. Server 165 has files 167, which may have been updated from computing device 170. Computing device 170 operates an application 174 which creates data files 172. Periodically, these files 172 may be used to update the server files 167. Then, when computing device 151 accesses the wireless network services 160 through RF card 152, files on the computing device may be properly updated. These files may be encrypted according to the expected security codes within RF card 152, or may be provided in a less secure manner.

Figure 6:
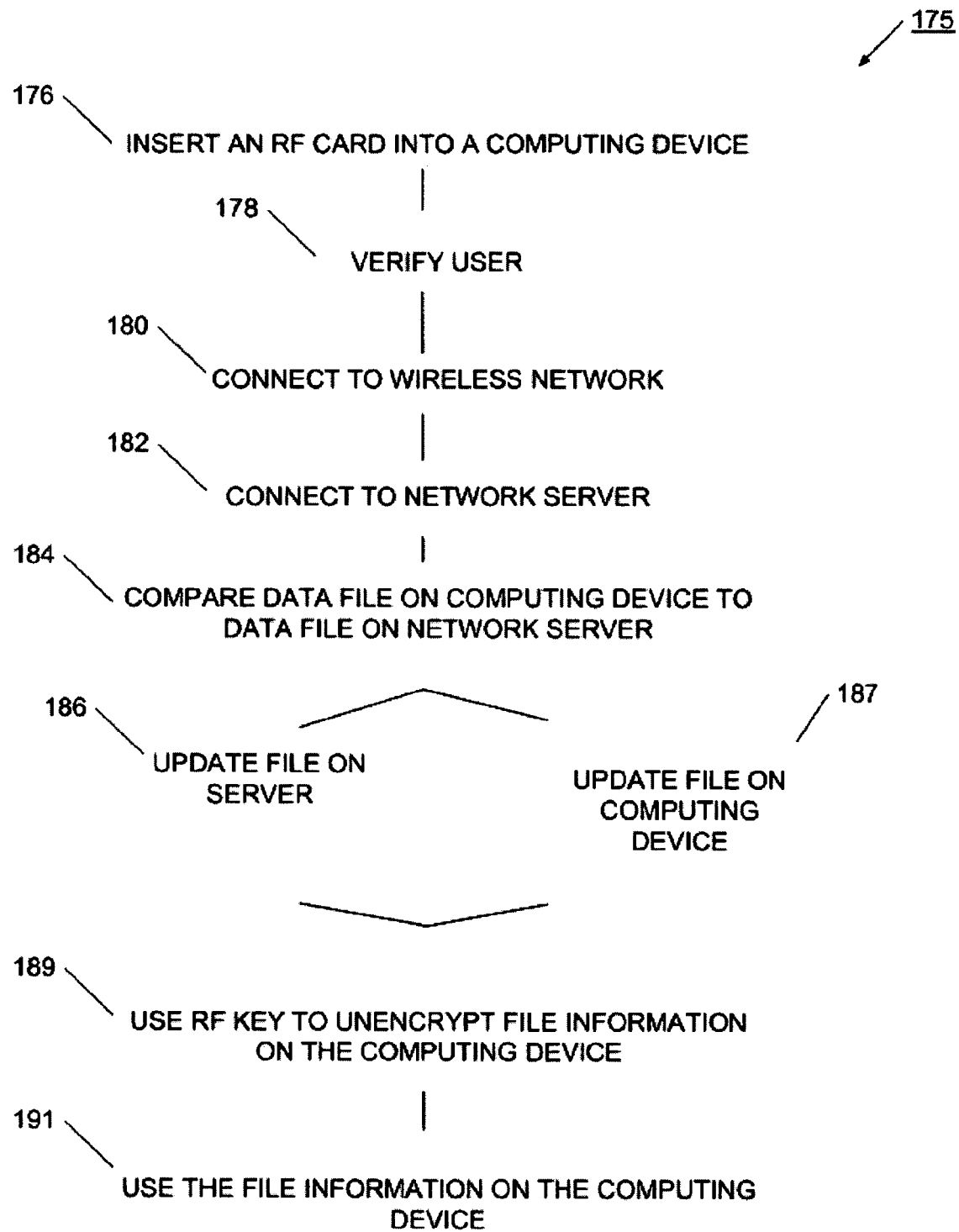
FIG. 6 is a flowchart of a method for providing updated files in accordance with the present invention.

Referring now to FIG. 6, a process for providing updated file information is illustrated. Process 175 initiates by inserting an RF card into a computing device as shown in block 176. The user is verified using password, username, or other security devices as shown in block 178. Once the user has been verified, the RF card connects with the wireless network as shown in block 180. Further, the computing device is connected to a network server as shown in block 182. Data files on the computing device may be compared to data files on the network server as shown in block 184. Depending upon which device has the most current file, the file in the server may be updated according to information on the computing device as shown in block 186, or the file in the computing device may be updated according to information on the network server as shown in block 187. Information stored on the computing device may be encrypted according to address, key, or authentication information contained on the RF card as shown in block 189. Once the computing device has an updated and unencrypted data file, then that information may be used by the local computing device as shown on block 191.

While particular preferred and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

What is claimed is:

1. A method for providing message contact information to a computing device that is configured to be detachably coupled to an RF card, the method operating on a wireless network service that is constructed to provide messaging capability, comprising:
   maintaining a message contact list on a server connected to the wireless network service;
   receiving an indication that the RF card has been activated in the computing device;
   retrieving the message contact list using identification information associated with the RF card; and
   transmitting the message contact list to the RF card in a form so that the RF card is enabled to locally store the contact list, wherein the message contact list is uniquely associated with the identification information of the RF card and thus enabling the message contact list to be available to any computing device that detachably couples to the RF card.

2. The method according to claim 1, wherein the messaging capability includes SMS (short message service) message capability, and the message contact list includes SMS address information.

3. The method according to claim 1, further including the step of determining if a preexisting message contact list on the computing device -is more current than the message contact list on the server.

4. The method according to claim 1, further including the step of updating the message contact list using another device communicating on the network.

5. The method according to claim 1, wherein the message contact list includes EMS (enhanced message service) address information.

6. The method according to claim 1, wherein the message contact list includes MMS (multimedia messaging service) address information.

7. A mobile computing system for communicating messages on a wireless network, comprising:
   a computing device;
   an RF card configured to be detachably coupled to the computing device;
   a memory and a processor, each of the memory and the processor being configured to be associated with at least one of the computing device and the RF card wherein the processor and the memory operates cooperatively to perform the steps of:
      connecting, at a predetermined time, to the wireless network using the RF card;
      accessing a network server;
      receiving a message contact list from the network server;
      storing the message contact list in the memory;
      using information in the message contact list to generate a message; and
      transmitting the message using the wireless network, wherein the message contact list is uniquely associated with identification information associated with the RF card, thus enabling the message contact list to be available to any computing device that detachably couples to the RF card.

8. The mobile computing system of claim 7, wherein the RF card is integrally constructed with the computing device.

9. The mobile computing system of claim 7, wherein the memory is in the computing device.

10. The mobile computing system of claim 7, wherein the memory is in the RF card.

11. The mobile computing system of claim 7, wherein the processor is in the computing device.

12. The mobile computing system of claim 7, wherein the processor is in the RF card.

13. The mobile computing system of claim 7, wherein the processor and the memory a refurther configured to execute the process step of determining if a preexisting message contact list on the computing device is more current than the message contact list on the server.

14. The mobile computing system of claim 7, wherein the predetermined time is at power-up of the computing device.

15. A mobile computing system for communicating on a wireless network, comprising:
   a computing device;
   an RF card configured to be detachably coupled to the computing device;
   a memory and a processor, each of the memory and the processor being configured to be associated with at least one of the computing device and the RE card, wherein the processor and the memory operates cooperatively to perform the steps of:
   a process operating the steps of:
      connecting to the wireless network using the RF card
      accessing a network sewer;
      receiving a file from the network server;
      encrypting the file using key information stored in the RF card;
      storing the encrypted file the memory, wherein the file is uniquely associated with identification information of the RF card and thus enabling the file to be available to any computing device that detachably couples to the RF card.

16. The mobile computing system of claim 15, further including the process steps of
   unencrypting the file using the key information stored in the RF card; and
   using the unencrypted file in another application program operating on the computing device.

17. The mobile computing system of claim 16, further comprising the step of deleting the unencrypted file information after it has been used.

18. The mobile computing system of claim 15, wherein the key information is an "Akey".

19. The mobile computing system of claim 15, wherein the key information is an access number assigned to the RF card.

* * * * *